United States Patent [19]

Bottum

[11] Patent Number: 5,076,198
[45] Date of Patent: Dec. 31, 1991

[54] SIGHT GLASS STRUCTURE AND METHOD OF INSTALLING THE SAME

[76] Inventor: Edward W. Bottum, 9357 Spencer Rd., Brighton, Mich. 48116

[21] Appl. No.: 620,578

[22] Filed: Dec. 3, 1990

Related U.S. Application Data

[62] Division of Ser. No. 438,782, Nov. 20, 1989, Pat. No. 5,000,367.

[51] Int. Cl.$^5$ ............................................. G01F 15/06
[52] U.S. Cl. .................................... 116/276; 228/119; 228/120; 73/331
[58] Field of Search ............... 228/119, 120, 133, 194, 228/222, 240, 246; 62/125, 129, 298; 73/323, 328, 330, 331; 116/264, 276

[56] References Cited

U.S. PATENT DOCUMENTS

| | | | |
|---|---|---|---|
| 2,053,765 | 9/1936 | Dana | 73/328 |
| 3,085,424 | 4/1963 | Berg | 62/125 |
| 3,108,566 | 10/1963 | Boggs | 228/120 |
| 3,225,555 | 12/1965 | Chatlos | 116/276 |
| 4,744,737 | 5/1988 | Yamamura et al. | 228/184 |
| 4,788,929 | 12/1988 | Krause et al. | 73/323 |
| 4,815,947 | 3/1989 | Okoma et al. | 228/184 |

Primary Examiner—Samuel M. Heinrich
Attorney, Agent, or Firm—Bertram F. Claeboe

[57] ABSTRACT

This invention is directed to a novel method of removably securing a sight glass member to a refrigeration vessel in hermetically sealed relation therewith. In accordance with the method concept, a ferrule or like tubular mounting means is fixedly attached to the vessel through an opening therein, and one end of the sight glass is located within the ferrule. Brazing metal is then positioned in contact with the sight glass member and ferrule, and the metal, member, and ferrule are heated by electromagnetic induction to melt the brazing metal and form a hermetic bond between the ferrule and sight glass member. By this method, leakage associated with threaded connections, and damage to the sight glass and extreme difficulty of removing the sight glass member when resistance or arc welding methods are used, are herein substantially entirely eliminated.

4 Claims, 1 Drawing Sheet

SIGHT GLASS STRUCTURE AND METHOD OF INSTALLING THE SAME

This is a division of application Ser. No. 07/438,782 filed Nov. 20, 1989, now U.S. Pat. No. 5,000,367.

BACKGROUND OF THE INVENTION

It is known in the art to which this invention pertains that sight glasses are employed in connection with certain components of refrigeration systems in order to obtain visual access to the interior thereof. Receivers are illustrative of such refrigeration components, and one prior art method of securing the sight glass body to the refrigeration component or vessel was to effect a threaded connection therebetween. Leakage of refrigerant from between the pipe threads was the inevitable result. In substitution for the threaded connection, an expedient employed by those skilled in the art has been to effect securement of the steel sight glass mounting body to the steel refrigerant component utilizing either resistance welding or arc welding techniques. Satisfactory results were again not obtained. First, during welding the steel surfaces often reach temperatures of approximately 3000° F., and by heat conduction, damage to the sight glass itself often occurs. Second, by reason of the effective weld bond between the two steel bodies, it is essentially impossible to remove the sight glass body if replacement of the sight glass portion is required.

SUMMARY OF THE INVENTION

The present invention is directed to a process concept productive by its practice of an essentially leak-proof seal between a sight glass body and a refrigeration component, and further featuring ease of removal of the body in the event replacement of the sight glass becomes necessary. Briefly stated, by applicant's novel process a preformed ferrule or bushing is suitably secured to the refrigeration component, a body or member with sight glass mounted therein is positioned in contact with the ferrule, brazing metal applied to the ferrule and body, and by electromagnetic induction the ferrule and body bonded together through the brazing metal, while simultaneously the sight glass is shielded to prevent the overheating thereof.

As the description proceeds in more detail, it will be noted that the sight glass body and ferrule are so configured as to be in slidable abutting relation, the brazing metal may be a wire annulus in surrounding contacting relationship with the body and ferrule, and the shielding means may be a heat sink positioned in protective relation to the sight glass so as to prevent heat damage thereto.

DESCRIPTION OF A PREFERRED EMBODIMENT

Figure 1:
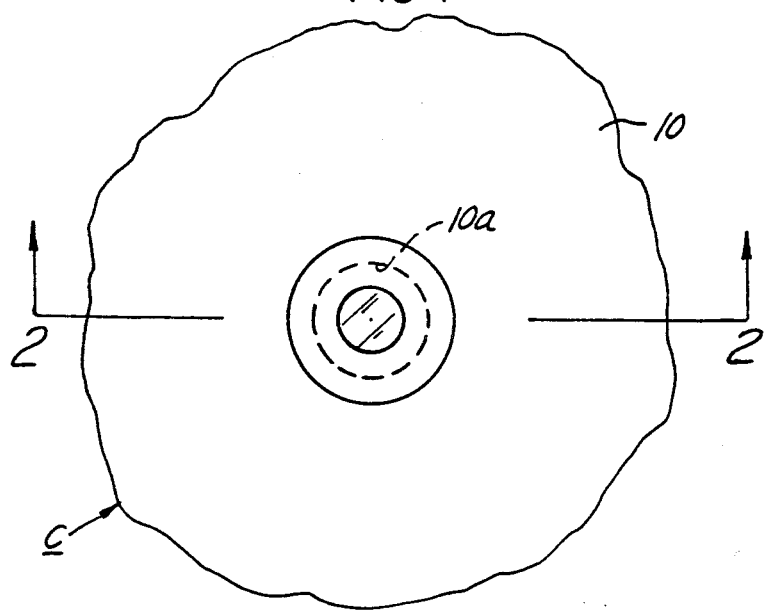
FIG. 1 is a fragmentary top plan view of a refrigeration component with sight glass body secured thereto.
Figure 2:
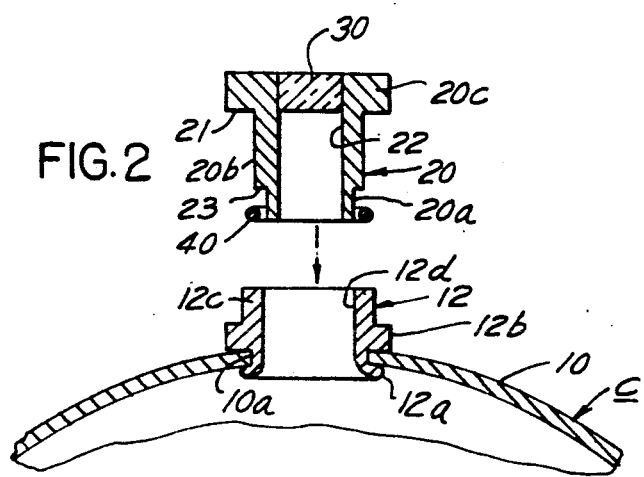
FIG. 2 is a vertical sectional view taken substantially along the line 2—2 of FIG. 1, and portraying one step in applicant's novel process.

Referring now first to FIGS. 1 and 2 of the drawings, a refrigeration component is designated generally therein by the legend C, and this illustratively may be a receiver or other vessel for containing a medium subject to pressure variations. Component C, wherefrom leaks cannot be tolerated, is provided with wall 10 having a hole or opening 10a formed therein. Secured to and within component wall 10 is a preformed ferrule or bushing 12 generally constructed of steel, and shaped to include at one end a radially outwardly directed annular flange or lip portion 12a, an annular shoulder portion 12b, and annular neck portion 12c. As shaped in the manner shown in FIGS. 2 and 3, ferrule 12 has provided therethrough passage or opening 12d communicating with the interior of refrigeration component C.

Various techniques may be employed to effect firm securement of the ferrule or bushing 12 to component wall 10. Presently hydrogen copper brazing is preferred, although arc welding may also be employed. It is also believed apparent that the contours of the ferrule may vary from the specific configuration shown.

Sight glass structures are employed in the refrigeration art and in fields generally related thereto for purposes of providing visual access to the interior of a particular vessel, and thereby permitting observation of specific conditions therein. It has been noted in the preceding description that earlier modes of securing the sight glass body to the refrigeration component have invariably resulted in either leakage, or damage to the sight glass, or the impossibility of removing the sight glass body if replacement of the fused glass is necessary.

These difficulties of prior art approaches are effectively surmounted by utilization in the novel process concept of this invention of sight glass body constructed as best shown in FIG. 2 of the drawings. The sight glass body or member shown therein is designated in its entirety by the numeral 20, and is preferably of steel composition. The member 20 is exteriorly of stepped wall configuration, or stated otherwise, of variable outer diameter. As so shaped or formed, sight body 20 includes at one end a generally cylindrical relatively thin wall reduced diameter portion 20a integral with a larger diameter central portion 20b unitary with an enlarged diameter head or cap portion 20c. At the juncture of the central and head portions 20b and 20c shoulder section 21 is formed thereby, while at the juncture of reduced diameter and central body portions 20a and 20b shoulder section 23 is provided.

The sight glass body or member 20 is axially passaged as at 22 throughout the length thereof, and affixed within one end of the passage 22 is sight glass 30. The glass 30 is of course transparent, and is fabricated in disc form of any heat and pressure resistant glass composition.

Figure 3:
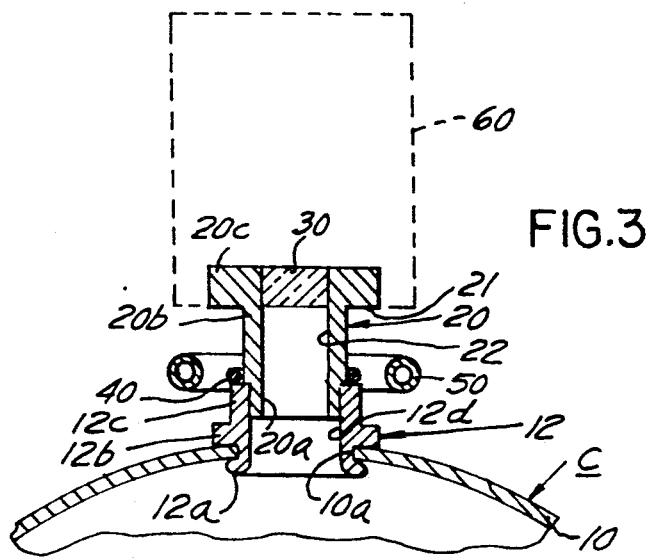
FIG. 3 is a vertical sectional view illustrating another step in the method of this invention, and showing by phantom lines the heat sink in operating position.

In performance of the novel method of this invention, and as is shown in FIGS. 2 and 3, a silver brazing ring 40 is positioned in encircling relationship with reduced diameter portion 20a of the steel sight glass body 20. The brazing metal providing the annulus 40 may be of the known nickel-silver type having a composition of about 18% nickel, 55-65% copper, and 27-17% zinc. Of course, brazing metals of the silver alloy type may also be employed, and generally these are constituted of 5-80% silver, 15-52% copper, balance zinc, plus tin and cadmium. The brazing annulus 40 is fluxed in conventional manner, and this may be accomplished by brushing on a commercially available flex paste.

Either prior to or after positioning of the brazing ring 40 as described, the sight glass body 20 is lowered or moved into the ferrule or tubular mounting means 12, that is, from the position of FIG. 2 into the location shown in FIG. 3. As appears in the latter view, shoulder 20 on the sight glass body 20 then abuts against the top wall of the ferrule annular neck portion 12c, and the reduced diameter portion 20a of the sight glass body 20 is received with the ferrule neck portion 12c. It is to be seen from FIG. 3 that the brazing ring 40 is seated upon the top wall of the ferrule neck portion 12c, and also wraps the annular body portion 20b of the sight glass body 20, thereby assuring accurate metal flow during the bonding operation.

Another step in applicant's novel process is to position an annular induction coil 50 in radially spaced and circumferentially surrounding relation to the silver brazing ring 40, and spaced a sufficient distance from the sight glass 30 as to assure there will be no heat damage thereto. However, to assure even further that the sight glass 30 will remain relatively cool during the bonding of the steel body 20 the ferrule 12, a heat sink device 60 is employed in the method of this invention. Device 60 shown in phantom lines in FIG. 3 is preferably constructed of copper, and may be of cap-like configuration so as to seat upon the head portion 20c of the sight glass body 20 in insulative surrounding relation to the sight glass 30, to thereby dissipate or absorb radiant energy.

Stated otherwise, the copper heat sink device 60 is effective to prevent the magnetic field of the induction coil 50 from lifting the sight glass by 20 during the silver soldering operation. It is further effective to shield the steel in the sight glass body 20 from the magnetic field, which also results in keeping the sight glass 30 cooler. Additionally, the heat sink device 60 prevents overheating and cracking of the glass 30 by absorbing or dissipating unwanted heat.

The induction coil 50 is preferably constructed of copper tubing, and the power supply therefor is conventionally an induction welder. As is the practice, a suitable coolant is circulated through the tubing 50. Temperatures at the bonding joint generally are 1200° F.–1400° F., preferably 1250° F., and a firm bond between the ferrule 12 and sight glass body 20 is normally obtained in about 5 to 6 seconds, due in some measure to the relative thinness of the wall portion 20a.

It may be seen from the foregoing that by applicant's method of assembly and the structure produced therefrom the problems associated with prior art procedures are effectively eliminated. Leaks associated with threaded connections are no longer present, damage to the sight glass from the high temperatures associated with resistance or arc welding cannot occur, and removal of the sight glass body, in the event the sight glass needs replacement, is greatly simplified. It is only necessary that induction heating, or electromatic induction again be employed. If desired, this same type of heat may be used to remove the sight glass body 20 from the ferrule 12 in the event repair or replacement is necessary. In totality, very significant cost savings result from practice of the present method.

Various changes and modifications to the invention have been noted in the above description, and these and other variations may of course be practiced without departing from the spirit of the invention or the scope of the subjoined claims.

I claim:

1. A refrigeration vessel structure, comprising a vessel, a ferrule secured to said vessel through an opening therein, said ferrule being shaped to include an annular neck portion, an annular shoulder portion, and a radially outwardly directed annular flange portion, said shoulder and flange portions cooperatively effecting a firm gripping securement of said ferrule to said vessel, a sight glass member partially slidably received in said neck portion of said ferrule, and a body of brazing metal removably securing said member to said ferrule.

2. A refrigeration vessel structure, comprising a vessel, a ferrule secured to said vessel through an opening therein, a sight glass member partially received in said ferrule, said sight glass member being shaped to include an annular glass-receiving head portion and integral variable outer diameter smooth-surfaced tubular body portion providing a shoulder section thereon abutting against the exposed end of said ferrule, and a body of brazing metal removably securing said member to said ferrule proximate to said region of abutment.

3. A refrigeration vessel as defined in claim 2, wherein the brazing metal is selected from the group consisting of the nickel-silver type and silver alloy type.

4. A refrigeration vessel structure, comprising a vessel, a ferrule secured to said vessel through an opening therein, said ferrule being shaped to include at one end thereof an annular neck portion and at the opposite end thereof a radially outwardly directed annular flange portions, said ferrule intermediate said neck and flange portions being further shaped to include an annular shoulder portion effective with said flange portion to grippingly secure said ferrule to said vessel through the opening therein, a sight glass member of stepped outer wall construction partially received in said ferrule in removable securement thereto, said sight glass member being shaped to include at one end thereof a generally cylindrical reduced diameter portion and at the opposite end thereof an enlarged diameter glass-receiving head portion, said sight glass member intermediate said reduced and said enlarged diameter portions being further shaped to include a generally cylindrical larger diameter central portion forming a shoulder portion with said reduced diameter portion abutting the neck portion of said ferrule when said sight glass member is positioned within said ferrule, and a body of brazing metal removably securing said sight glass member to said ferrule proximate to the region of abutment therebetween.

* * * * *